US010857641B2

(12) United States Patent
DeYoe

(10) Patent No.: US 10,857,641 B2
(45) Date of Patent: Dec. 8, 2020

(54) TOOL FOR FACILITATING THE MACHINING OF RECESSED INSERTS

(71) Applicant: Rolls-Royce Corporation, Indianapolis, IN (US)

(72) Inventor: David DeYoe, Martinsville, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 638 days.

(21) Appl. No.: 15/680,564

(22) Filed: Aug. 18, 2017

(65) Prior Publication Data

US 2019/0054588 A1 Feb. 21, 2019

(51) Int. Cl.

| B23B 49/02 | (2006.01) |
|---|---|
| B23Q 9/00 | (2006.01) |
| B23Q 11/00 | (2006.01) |
| B23Q 17/24 | (2006.01) |
| B24B 55/10 | (2006.01) |
| B24B 23/00 | (2006.01) |

(52) U.S. Cl.
CPC ........ B23Q 9/0042 (2013.01); B23Q 11/0046 (2013.01); B23Q 11/0071 (2013.01); B23Q 17/2404 (2013.01); B24B 23/005 (2013.01); B24B 55/10 (2013.01); B23B 49/02 (2013.01); *Y10T 408/50* (2015.01); *Y10T 408/568* (2015.01); *Y10T 408/569* (2015.01)

(58) Field of Classification Search
CPC ....... B23G 9/009; B23B 47/284; B23B 27/18; Y10T 408/558; Y10T 408/568; Y10T 408/569; B23Q 11/0046

USPC .......... 408/97, 115 B, 72 B, 241 B
See application file for complete search history.

(56) References Cited

U.S. PATENT DOCUMENTS

| 3,081,808 A | 3/1963 | Rosan et al. | |
|---|---|---|---|
| 3,108,500 A * | 10/1963 | Merriman ............. | B23B 49/023 408/241 R |
| 3,163,197 A | 12/1964 | Rosan et al. | |
| 3,204,284 A * | 9/1965 | Merriman ............. | F16B 37/122 16/2.1 |
| 3,220,454 A | 11/1965 | Neuschotz | |
| 3,233,318 A | 2/1966 | Neuschotz | |
| 3,279,053 A | 10/1966 | Neuschotz | |
| 3,280,872 A | 10/1966 | Neuschotz | |
| 3,289,725 A | 12/1966 | Gehring | |
| 3,297,071 A | 1/1967 | Neuschotz et al. | |
| 3,319,690 A | 5/1967 | Rosan et al. | |
| 3,322,005 A | 5/1967 | Neuschotz | |
| 3,481,022 A | 12/1969 | Neuschotz | |
| 3,495,642 A | 2/1970 | Kleinhenn | |
| 3,768,918 A * | 10/1973 | Bethke ................. | B23B 49/023 408/72 B |
| 5,356,245 A * | 10/1994 | Hosoi ..................... | B08B 15/04 408/56 |
| 5,388,933 A * | 2/1995 | Dunbar ................ | B23B 47/284 408/115 B |

(Continued)

*Primary Examiner* — Orlando E Aviles
*Assistant Examiner* — Mahdi H Nejad
(74) *Attorney, Agent, or Firm* — Barnes & Thornburg LLP

(57) ABSTRACT

The present disclosure relates generally to a tool that facilitates machining of inserts mounted in a primary component. More specifically, tools according to the present disclosure may be designed to support removal of recessed inserts in primary components without damaging the underlying primary components.

19 Claims, 4 Drawing Sheets

(56) References Cited

U.S. PATENT DOCUMENTS

| | | | | |
|---|---|---|---|---|
| 5,630,682 | A * | 5/1997 | Davey | B23B 49/02 |
| | | | | 408/67 |
| 5,649,791 | A * | 7/1997 | Connolly | B23B 47/284 |
| | | | | 408/1 R |
| 7,175,371 | B2 * | 2/2007 | Vidal | B23Q 11/0064 |
| | | | | 408/1 R |
| 7,195,429 | B2 * | 3/2007 | Dods | B23B 47/287 |
| | | | | 408/67 |
| 8,757,937 | B1 * | 6/2014 | Inman | B23B 49/026 |
| | | | | 408/76 |
| 9,304,223 | B2 * | 4/2016 | DeMaira | G01V 3/08 |
| 2003/0215296 | A1 | 11/2003 | Botelle et al. | |
| 2015/0375309 | A1 | 12/2015 | Burtscher et al. | |
| 2016/0136738 | A1 * | 5/2016 | Gruhn | B23B 47/28 |
| | | | | 408/1 R |
| 2018/0111204 | A1 * | 4/2018 | Kasahara | B23B 49/02 |

* cited by examiner

TOOL FOR FACILITATING THE MACHINING OF RECESSED INSERTS

FIELD OF THE DISCLOSURE

The present disclosure relates generally to a tool that facilitates machining of inserts mounted in a primary component, and more specifically to a tool that may be used to remove recessed inserts without damaging primary components.

BACKGROUND

Inserts can be assembled into large primary components to provide detailed features not easily machined into the primary component. These inserts can sometimes be removable to allow for repair/replacement of the detailed features without requiring the large primary component to be handled. Removing these inserts to replace them using standard machine tools can cause damage to underlying primary components, which can often result in expensive repairs.

Reusability of an insert or replacing detailed features without handling the primary component or without requiring additional hardware on the primary component are desirable features for large components. Because the ability to machine inserts and detailed components offers economic advantages in a large array of mechanical devices, it is desirable to facilitate the machining of inserts with minimal risk to primary components.

SUMMARY

The present disclosure may comprise one or more of the following features and combinations thereof.

According to one aspect of the present disclosure, a tool for facilitating the removal of recessed inserts from a primary component includes a tool body. The tool body includes an interface panel that is formed to define an interface-piece aperture. The interface panel has a first side adapted to be placed in contact with an outer surface of the primary component. The interface-piece aperture sized to allow a machine tool to extend through the interface panel toward a recessed insert assembled with a primary component so that the outer surface of the primary component around the interface-piece aperture is protected from the machine tool when the machine tool is inserted through the interface-piece aperture.

In illustrative embodiments, the tool also includes a guide. The guide is coupled to the tool body along a second side of the interface panel, opposite the first side that is adapted to be placed in contact with the primary component. The guide formed to include an angled tool-receiver surface that (i) surrounds a guide aperture aligned with the interface-piece aperture and that (ii) is shaped to slope toward the guide aperture so as to encourage a machine tool moving toward the guide through the guide aperture and the interface-piece aperture.

In illustrative embodiments, the tool includes a recess plug. The recess plug is coupled to the interface piece of the tool body and is configured to extend away from the first side of the interface piece into a recess that extends from the outer surface of the primary component. The recess plug is formed to define a plug aperture aligned with the interface-piece aperture and sized to allow the machine tool to extend through the recess plug toward the recessed insert. Thus, the side surface of the primary component that defines that recess is protected from the machine tool when the machine tool is inserted through the plug aperture.

In illustrative embodiments, the guide includes a tool receiver and an attachment ring. The tool receiver defines the guide aperture and the angled tool-receiver surface. The attachment ring extends from the tool receiver away from the guide aperture.

In illustrative embodiments, the recess plug is formed to include an O-ring receiving feature and an O-ring is located in the O-ring receiving feature. The O-ring extends around the recess plug in order to engage the side surface when the machine tool is inserted through the plug aperture to hold the tool in place during removal of the recessed insert.

In illustrative embodiments, the interface piece includes an interface panel and a plug mount coupled to the interface panel. The interface panel provides the first side surface of the interface piece. The plug mount is configured to allow the removable attachment of the recess plug to the plug mount. In illustrative embodiments, the plug mount included in the tool body is illustratively formed to include a mount threads and the recess plug is formed to include plug threads engaged with the mount threads to removably couple the recess plug to the tool body.

In illustrative embodiments, the tool includes a lighting system. The lighting system includes a plurality of lights mounted around the interface-piece aperture to illuminate the interface-piece aperture. The lighting system is coupled to an internal power source (battery) housed in the body.

In illustrative embodiments, the tool includes a vacuum system. The vacuum system includes at least one vacuum port arranged to open into a tool passageway defined, at least in part, by the interface-piece aperture and the plug aperture in order to remove debris generated by the machine tool when used to remove an insert.

In illustrative embodiments, the vacuum system includes at least one vacuum duct that extends from the at least vacuum port through the tool body to carry debris away from the tool passageway. The vacuum system may also include a vacuum connector. The vacuum connector is coupled to the tool body at a location spaced apart from the vacuum port and coupled fluidly to at least one vacuum duct. The vacuum connector is configured to be coupled to an external vacuum source.

According to another aspect of the present disclosure, a tool for facilitating the removal of recessed inserts from a primary component may include a tool body, a recess plug, and a lighting system. The tool body may include an interface panel with a first side adapted to be placed in contact with an outer surface of the primary component. The interface panel may be formed to define an interface-piece aperture sized to allow a machine tool to extend through the interface panel toward a recessed insert assembled with the primary component. Thus, the outer surface of the primary component around the interface-piece aperture is protected from the machine tool when the machine tool is inserted through the interface-piece aperture.

In illustrative embodiments, the recess plug may be coupled to the interface piece of the tool body. The recess plug may be configured to extend away from the first side of the interface piece into a recess that extends from the outer surface of the primary component. The recess plug may be formed to define a plug aperture aligned with the interface-piece aperture and sized to allow the machine tool to extend through the recess plug toward the recessed insert. Thus, the side surface of the primary component around the recess is protected from the machine tool when the machine tool is inserted through the plug aperture.

In illustrative embodiments, lighting system may include a plurality of lights mounted to the tool body and configured to illuminate the interface-piece aperture. Thus, the machine tool is visible when the machine tool is inserted through the interface-piece aperture. The plurality of lights may be spaced apart around the circumference of the interface-piece aperture.

In illustrative embodiments, the interface piece of the tool body may be formed to include light openings arranged around the interface-piece aperture and each of the plurality of lights are arranged in a corresponding light opening.

In illustrative embodiments, the tool includes a vacuum system. The vacuum system may include at least one vacuum port and a vacuum connector spaced apart from the vacuum port. The vacuum port may be arranged in fluid communication with a tool passageway defined by the interface-piece aperture and the plug aperture in order to remove debris generated by the machine tool when used to remove an insert. The vacuum connector is in fluid communication with the vacuum port and is configured to be coupled to an external vacuum source.

In illustrative embodiments, the lighting system includes a battery and a switch. The battery may be housed in the tool body. The switch may be electrically coupled between the plurality of lights and the battery.

According to yet another aspect of the present disclosure, a tool for facilitating the removal of recessed inserts from a primary component may include a tool body, a recess plug, and a vacuum system. The tool body may include an interface panel with a first side adapted to be placed in contact with an outer surface of the primary component. The interface panel may further be formed to define an interface-piece aperture sized to allow a machine tool to extend through the interface panel toward a recessed insert assembled with the primary component so that the outer surface of the primary component around the interface-piece aperture is protected from the machine tool when the machine tool is inserted through the interface-piece aperture.

In illustrative embodiments, the recess plug may be coupled to the interface piece of the tool body and may be configured to extend away from the first side of the interface piece into a recess that extends from the outer surface of the primary component. The recess plug may be formed to define a plug aperture aligned with the interface-piece aperture and sized to allow the machine tool to extend through the recess plug toward the recessed insert. Thus, the side surface of the primary component that defines the recess is protected from the machine tool when the machine tool is inserted through the plug aperture.

In illustrative embodiments, the vacuum system may include at least one vacuum port arranged in fluid communication with a tool passageway defined by the interface-piece aperture and the plug aperture in order to remove debris generated by the machine tool when used to remove an insert. The vacuum system may include at least one vacuum duct that extends from the at least vacuum port through the tool body to carry debris away from the tool passageway.

In illustrative embodiments, the vacuum system may include a vacuum connector coupled to the tool body at a location spaced apart from the vacuum port. The vacuum connector may be coupled fluidly to the at least one vacuum duct. The vacuum connector may be coupled to an external vacuum source.

In illustrative embodiments, the vacuum system may include a plurality of vacuum ports. The various vacuum ports may be spaced circumferentially from one another around the tool passageway and may be arranged to open into the tool passageway.

In illustrative embodiments, the tool may also include a lighting system. The lighting system may include a plurality of lights configured to illuminate the tool passageway. The plurality of lights may each be mounted to the tool body and spaced circumferentially from one another around the tool passageway.

These and other features of the present disclosure will become more apparent from the following description of the illustrative embodiments.

DETAILED DESCRIPTION OF THE DRAWINGS

Figure 1:
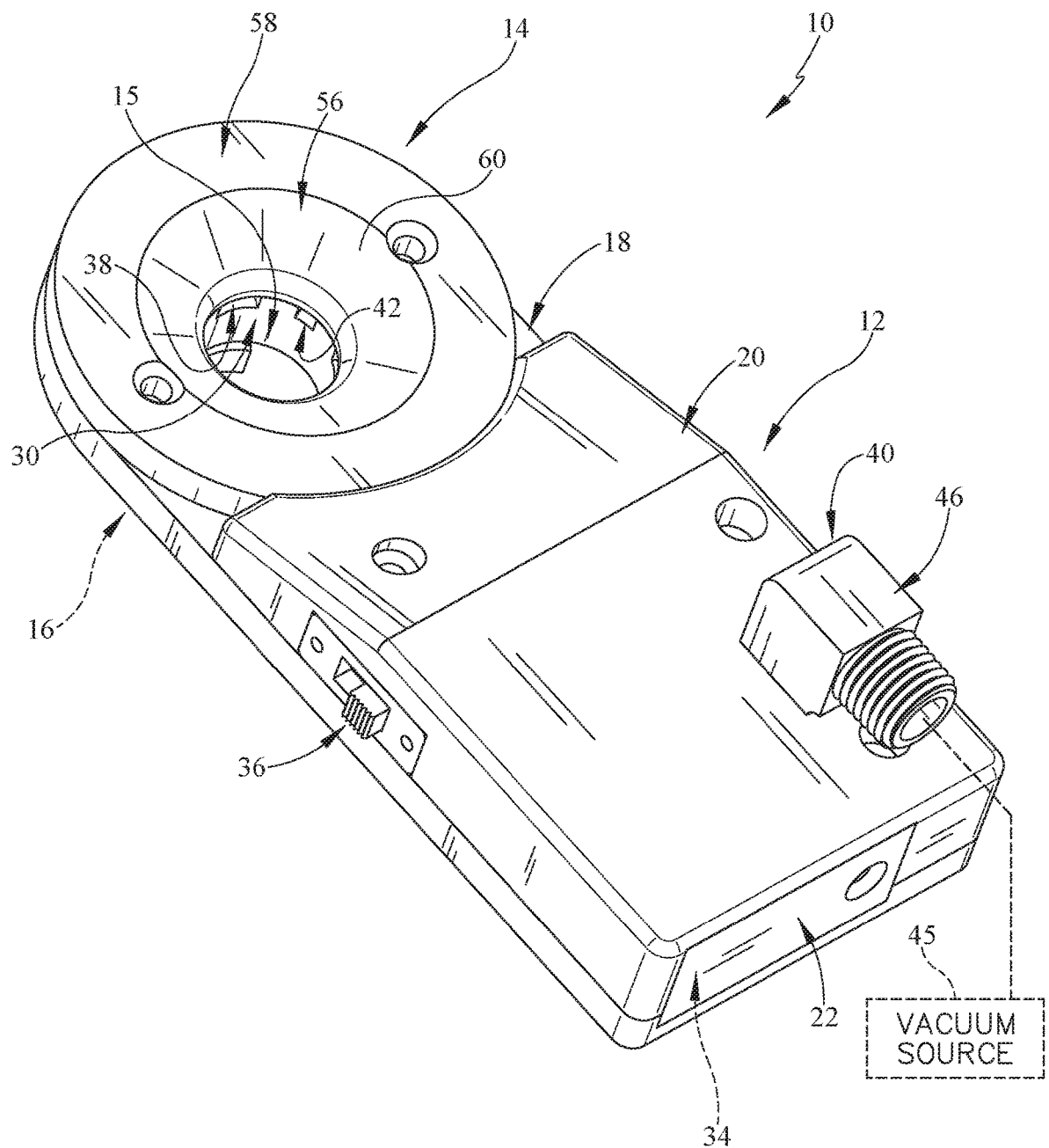
FIG. 1 is a bottom perspective view of a tool adapted to facilitate the removal of recessed inserts from a primary component showing that the tool includes a tool body and a guide having an angled tool-receiver surface sloped to encourage a machine tool toward a tool passageway formed through the tool body so that the tool body protects the primary component surfaces around the insert from a machine tool used to remove the insert.

For the purposes of promoting an understanding of the principles of the disclosure, reference will now be made to a number of illustrative embodiments illustrated in the drawings and specific language will be used to describe the same.

Figure 2:
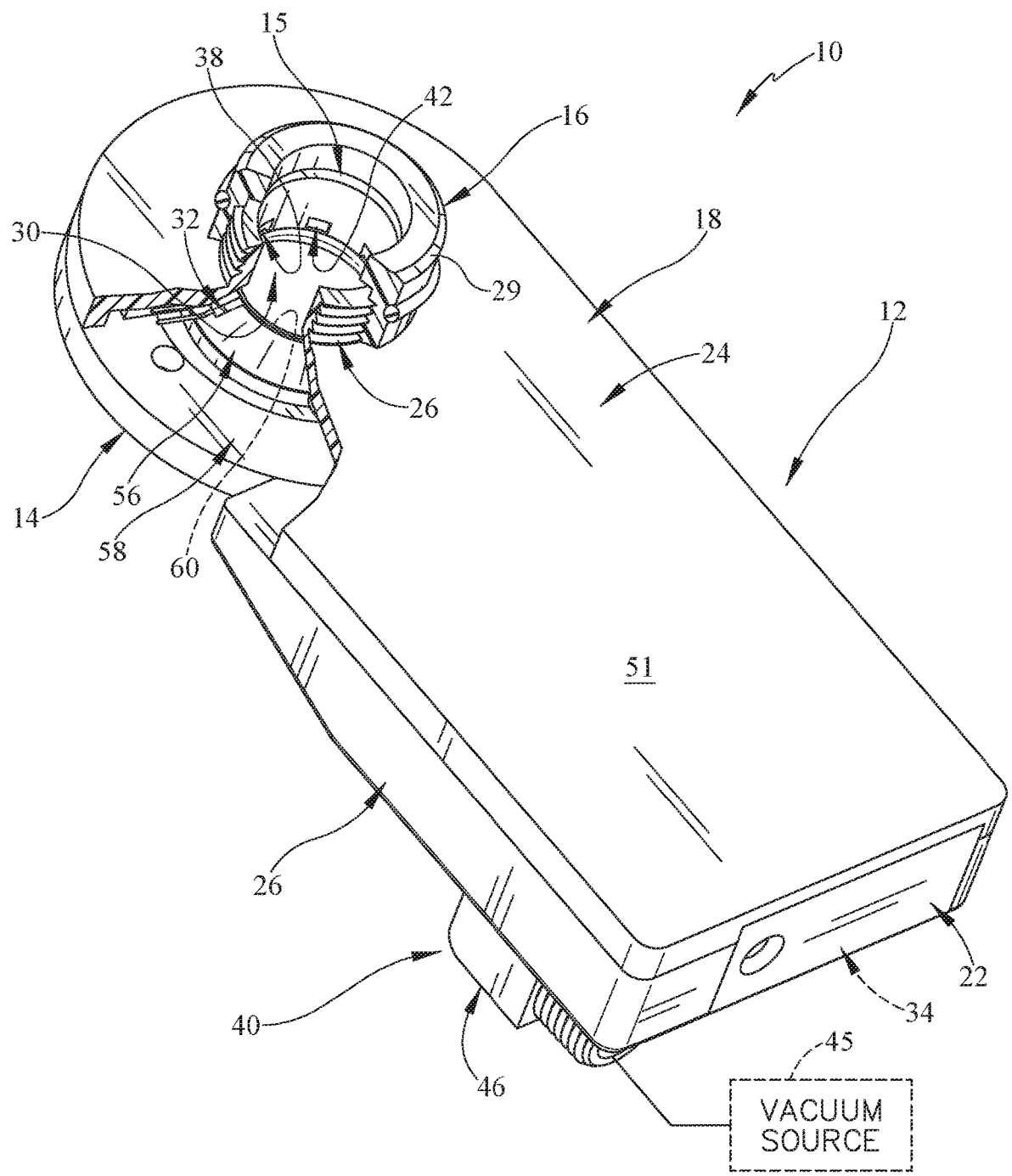
FIG. 2 is a top perspective view of the tool in FIG. 1 showing that the tool includes a recess plug mounted to the tool body by threads that is adapted to extend into a recess in a primary component that surrounds the insert to be removed so that the side wall of the recess is protected when the insert is removed using the machine tool.
Figure 3:
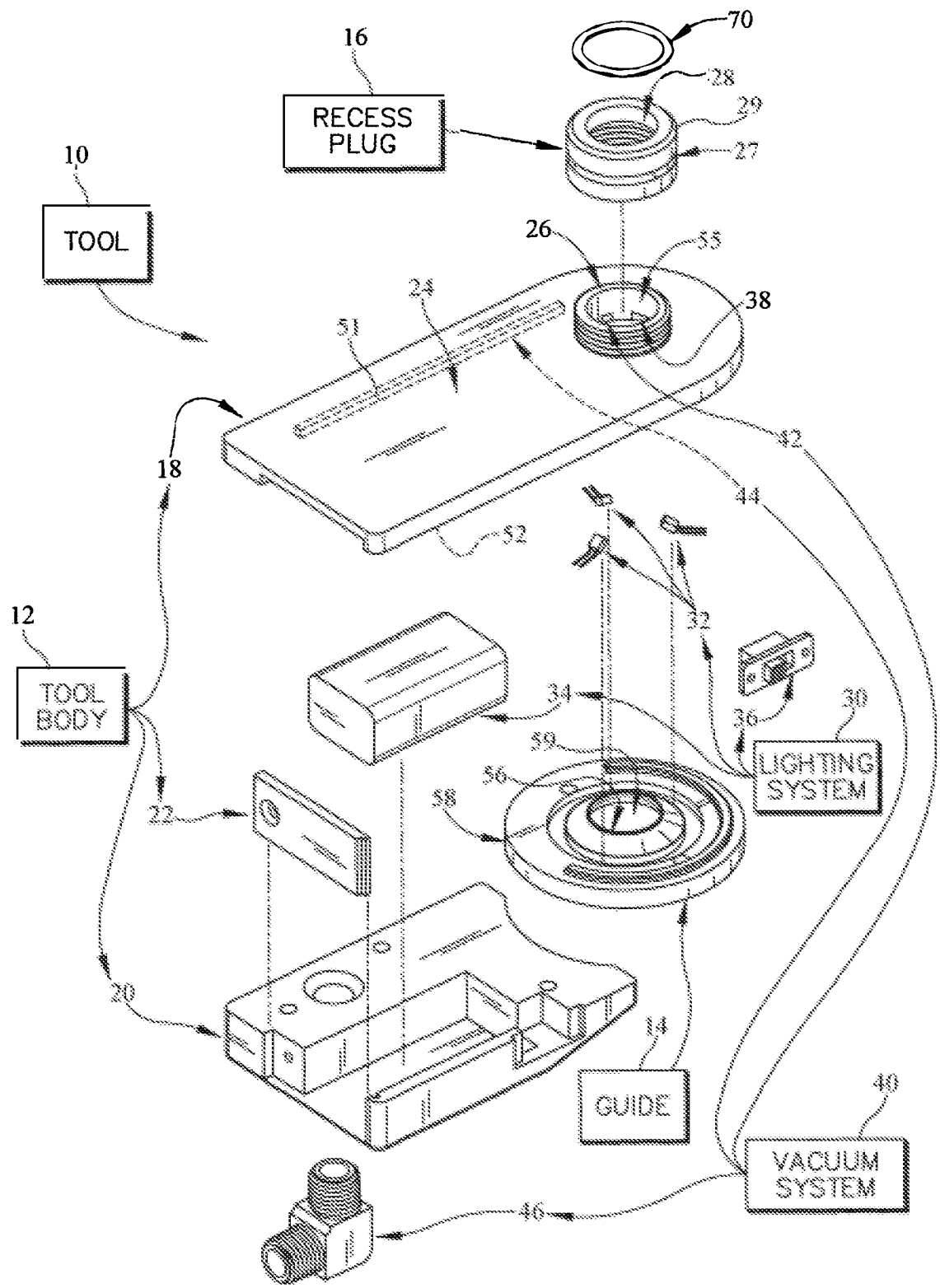
FIG. 3 is an exploded perspective view of the tool in FIGS. 1 and 2 showing the that the tool body is made up of an interface piece, a housing piece, and an access panel piece and showing that the tool further includes a lighting system for illuminating the insert to be removed and a vacuum system for removing debris created during removal of the insert.

A tool 10 adapted to facilitate the machining and removal of recessed inserts 110 from a primary component 100 is shown in FIGS. 1-4. The tool 10 is configured to protect surfaces 101, 104 of the primary component 100 when a machine tool 105, illustratively a grinder 105, is used to remove the insert 110 so that the primary component 100 is not damaged as suggested in FIG. 4. The tool 10 also includes a lighting system 30 and a vacuum system 40 as shown in FIG. 3. The lighting system 30 provides means for illuminating workspace around the insert 110 during removal of the insert 110. The vacuum system 40 provides means for evacuating debris from workspace around the insert 110 generated during removal of the insert 110.

Figure 4:
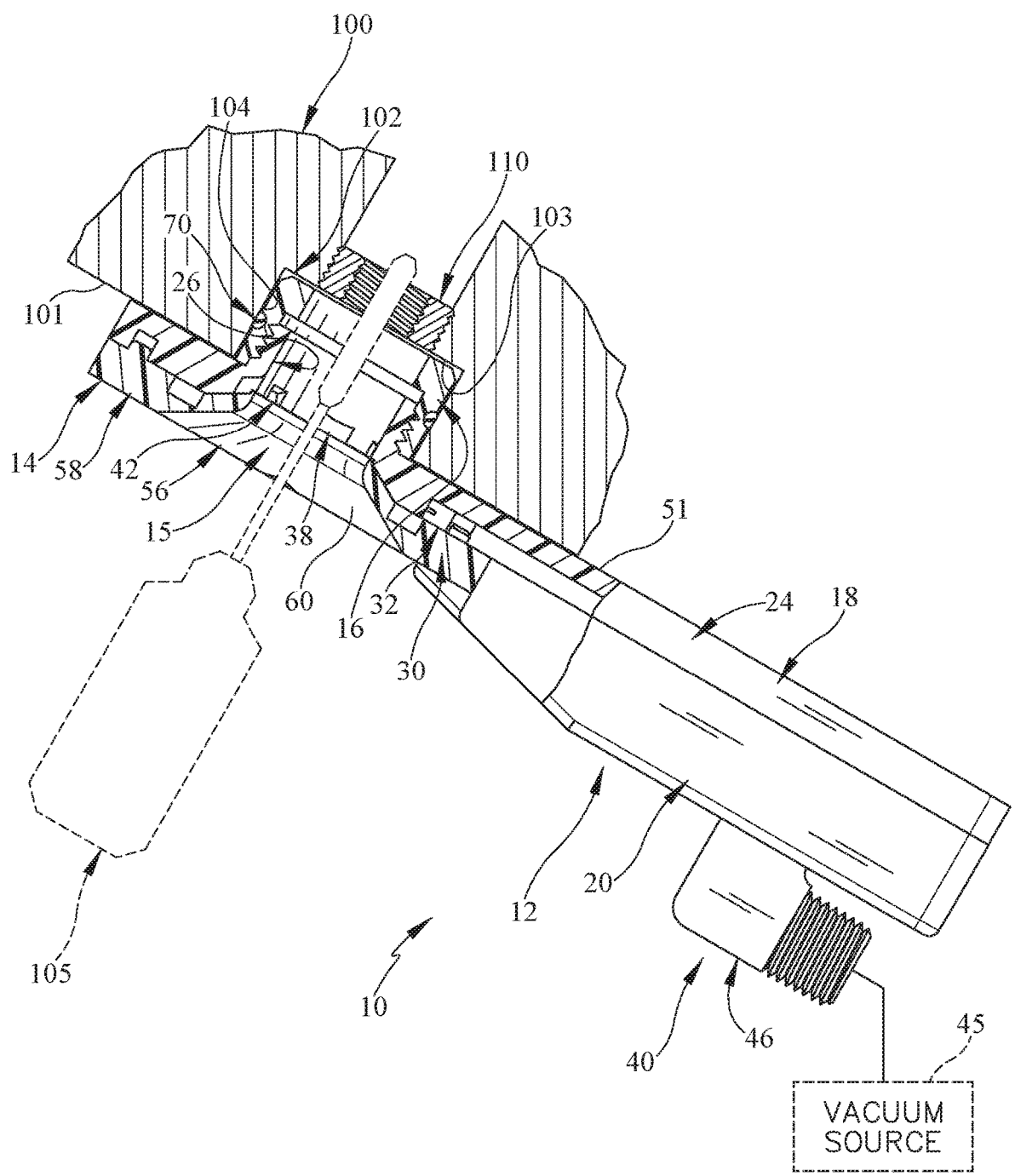
FIG. 4 is a cross-sectional side elevation view of the tool in FIGS. 1, 2, and 3 showing the tool in place relative to a primary component and an insert and showing a machine tool extending through the tool to grind away the insert for removal.

The tool 10 is adapted to be used in conjunction with the grinder 105 to remove the insert 110 from the primary component 100 as suggested in FIG. 4. The tool 10 illustratively includes a tool body 12, a guide 14, and a recess plug 16 as shown in FIGS. 1-3. The tool body 12 is configured to be placed against the primary component 100 to protect an exterior surface 101 of the primary component 100 when the grinder 105 is used to remove the insert 110 as suggested in FIG. 4. The guide 14 is coupled to the tool body 12 and is shaped to encourage the grinder 105 through a tool passageway 15 formed through the tool 10 toward the insert 110 as shown in FIGS. 1 and 4. The recess plug 16 is coupled to the tool body 12 and is configured to be inserted into a recess 102 formed in the primary component 100 around the insert 110 to protect a side wall 104 of the primary component 100 when the grinder 105 is used to remove the insert 110 as suggested in FIG. 4.

The tool body 12 is shaped to conform to the exterior surface 101 of the primary component 100 when the tool body 12 is placed against the primary component 100 as shown in FIG. 4. The tool body 12 includes an interface piece 18, a housing piece 20, and an access panel 22 as shown in FIG. 3. The interface piece 18 interfaces with the exterior surface 101 of the primary component 100. The housing piece 20 couples to the interface piece to support various other components of the tool 10 via fasteners (not shown). The access panel 22 provides a removable piece allowing access to an internal space 25 of the tool body 12, illustratively to allow battery 34 change out.

The interface piece 18 of the tool body 12 includes an interface panel 24 that engages the primary component 100 and a plug mount 26 that extends from the interface panel 24 to support the recess plug 16. The interface panel 24 has a first side 51 that conforms to and contacts the exterior surface 101 of the primary component 100 when the tool body 12 is placed against the primary component 100 as shown in FIG. 4. The interface panel 24 is formed to define an interface aperture 55 sized to allow the grinder 105 to pass through. The plug mount 26 of the interface piece 18 is illustratively threaded and extends from the first side 51 of the interface panel 24 around the interface aperture 55. The interface piece 18 may comprise polymeric materials or other relatively soft materials designed to avoid scratching the primary component 100.

The guide 14 is coupled to the interface piece 18 along a second side 52 of the interface panel 24 and is configured to encourage the grinder 105 to move through the interface aperture 55 as suggested in FIGS. 1 and 4. The guide 14 includes a tool receiver 56 and an attachment ring 58 as shown in FIG. 1. The tool receiver 56 defines a guide aperture 59 aligned with the interface aperture 55 and an angled tool-receiver surface 60 shaped to slope toward the guide aperture 59 so as to encourage the grinder 105 through the guide aperture 59 and the interface-piece aperture 55. The attachment ring 58 extends from the tool receiver 56 away from the guide aperture 59 and is coupled to the interface piece 18 of the tool body 12.

The recess plug 16 is removably coupled to the plug mount 26 of the interface piece 18 included in tool body 12 via a threaded connection as shown in FIG. 2. The recess plug 16 extends into the recess 102 formed in the primary component 100 around the insert 110 and is sized to protect a side wall 104 and a shoulder 103 of the primary component 100. The recess plug 16 may be removed and replaced with differently shaped/sized recess plugs (not shown) when the tool 10 is used to remove inserts from differently sized recesses. In the illustrative embodiment, the recess plug 16 is round and is formed to include a plug aperture 28 that is aligned with interface aperture 55 and guide aperture 59 such that apertures 28, 55, 59 cooperate to define tool passageway 15.

The exemplary recess plug 16 is made from relatively soft materials designed to avoid scratches when inserted into recess 102. In some embodiments, the recess plug 16 comprises polymeric materials. In some embodiments the recess plug 16 comprises nylon.

The recess plug 16 is formed to include an O-ring receiving groove 27 and a chamfer 29 as shown in FIGS. 2 and 3. An O-ring 70 is located in the O-ring receiving groove 27. The O-ring 70 extends around the recess plug 16 in order to engage the side surface 104 when the grinder 105 is inserted through the plug aperture 28 so that the tool 10 is held in place during insert 110 removal. The O-ring 70 may be made of sacrificial material such as nylon so that it does not damage or scratch the side wall 104. The chamfer 29 is arranged at the end of the recess plug 16 and is shaped to encourage centering of the recess plug 16 when inserted into the recess 102 in the primary component 100.

The lighting system 30 of the tool 10 is integrated with the tool body 12 and is configured to selectively illuminate the tool passageway 15 as suggested in FIG. 3. The lighting system 30 illustratively includes light emitting diodes (LEDs) 32, a battery 34, and a switch 36 as shown in FIG. 3. The LEDs are configured to illuminate the interface aperture 55 so that the grinder 105 is visible when the grinder 105 is inserted through the interface aperture 55. The LEDs are mounted to the tool body 12 in circumferentially spaced apart openings 38 formed in the interface panel 24. The battery 34 is housed in the tool body 12 and may be replaced by removing the access panel 22. The switch 36 is mounted to the tool body 12 and is electrically connected between the LEDs 32 and the battery 34.

The vacuum system 40 is integrated into the tool 10 and is configured to remove debris generated by the grinder 105 when used to remove the insert 110 as suggested in FIG. 4. The vacuum system 40 includes vacuum ports 42 arranged in fluid communication with the tool passageway 15, a vacuum duct 44 that extends from the vacuum ports 42, and a vacuum connector 46 connected to the vacuum duct 44. The vacuum ports 42 are spaced circumferentially from one another around the interface aperture 55 of the tool passageway 15 and open into the tool passageway 15. In the illustrated example, the vacuum ports 42 are interspersed circumferentially between LEDs 32 of the lighting system 30 around the interface aperture 55. The vacuum duct 44 is formed in the interface panel 24 and extends through the tool body 12 to carry debris away from the tool passageway 15. The vacuum connector 46 is coupled to the tool body 12 at a location spaced apart from the vacuum ports 42 and is configured to be coupled to an external vacuum source 45.

In some embodiments, components of the tool 10 may be integrated into monolithic one-piece parts or further subdivided into multiple pieces. For example, the guide 14 and/or the recess plug 16 may be integrated with the tool body 12 to form a one-piece part.

The tool 10 is shown in use with a grinder 105 before removing/replacing the insert 110 from in the primary component 100 in the cross-sectional view of FIG. 4. According to one method of removing the insert 110, the tool 10 is placed in engagement with the primary component 100 by inserting the recess plug 16 into the recess 102 of the primary component 100 and moving the interface panel 24 into contact with the external surface 101 of the primary component 100.

The lighting system 30 may be turned on by moving the switch 36 to the on position so that the tool passageway 15 is illuminated. Illumination of the tool passageway 15 may make the grinder 105 and the insert 110 more visible during performance of the described method.

The vacuum system 40 may be engaged by applying negative pressure from the external vacuum source 45. Application of vacuum to remove debris during removal of the insert 110 may allow an operator to avoid debris falling into the primary component 100 and may ease clean up during insert 110 removal.

The method may include moving the grinder 105 through the tool passageway 15 into the recess 102 formed in the primary component 100 as shown in FIG. 4. The external surface 101 of the primary component 100 and the side wall 104 of the recess 102 are protected by the tool 10 during movement of the grinder through the tool passageway 15. The grinder 105 may then remove material from the insert 110 until the insert is suitable for removal from primary component 100. The grinder 105 may be withdrawn from the primary component 100.

The tool 10 may then be disengaged from the primary component 100. A new or repaired insert 100 may be reinstalled into the primary component 100 after the original insert 110 is removed with or without the tool 10 engaged with the primary component 100.

It is conceived that the tool 10 may be used or obviously modified for use in the removal of non-recessed inserts. The tool 10 may also be used in various machining operations related to recessed/non-recessed inserts or other components.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A tool for facilitating removal of recessed inserts from a primary component, the tool comprising
    a tool body including an interface piece with a first side adapted to be placed in contact with an outer surface of the primary component and formed to define an interface-piece aperture sized to allow a machine tool to extend through the interface piece toward a recessed insert assembled within the primary component so that the outer surface of the primary component around the interface-piece aperture is protected from the machine tool when the machine tool is inserted through the interface-piece aperture,
    a guide coupled to the tool body along a second side of the interface piece, opposite the first side, the guide formed to include an angled tool-receiver surface that (i) surrounds a guide aperture aligned with the interface-piece aperture, and (ii) that is shaped to slope toward the guide aperture so as to encourage the machine tool moving toward the guide through the guide aperture and the interface-piece aperture; and
    a recess plug coupled to the interface piece of the tool body, the recess plug configured to extend away from the first side of the interface piece into a recess that extends inwardly from the outer surface of the primary component, the recess including an annular shoulder defining a stepped interior region defining a first interior diameter axially outward of the annular shoulder and defining a second interior diameter smaller than the first interior diameter axially inward of the annular shoulder, the recessed insert arranged within the interior region having the second interior diameter, and the recess plug arranged within the interior region having the first diameter and resting on the annular shoulder, formed to define a plug aperture aligned with the interface-piece aperture and sized to allow the machine tool to extend through the recess plug toward the recessed insert so that a side surface and the annular shoulder of the primary component that defines that recess is protected from the machine tool when the machine tool is inserted through the plug aperture.

2. The tool of claim 1, wherein the guide includes a tool receiver and an attachment ring, such that the tool receiver defines the guide aperture and the angled tool-receiver surface, and the attachment ring extends from the tool receiver away from the guide aperture.

3. The tool of claim 1, wherein the recess plug is formed to include an O-ring receiving feature and an O-ring is located in the O-ring receiving feature, and the O-ring extends around the recess plug in order to engage the side surface when the machine tool is inserted through the plug aperture.

4. The tool of claim 1, wherein the interface piece includes an interface panel and a plug mount coupled to the interface panel, the interface panel provides a first side surface of the interface piece, and the plug mount is configured to allow a removable attachment of the recess plug to the plug mount.

5. The tool of claim 4, wherein the plug mount included in the tool body is formed to include mount threads and the recess plug is formed to include plug threads engaged with the mount threads to removably couple the recess plug to the tool body.

6. The tool of claim 1 further comprising a lighting system including a plurality of lights mounted around the interface-piece aperture to illuminate the interface-piece aperture.

7. The tool of claim 6 wherein the lighting system is coupled to an internal power source housed in the tool body.

8. The tool of claim 1 further comprising a vacuum system including at least one vacuum port arranged to open directly into a tool passageway defined, at least in part, by the interface-piece aperture and the plug aperture in order to remove debris generated by the machine tool when used to remove the recessed insert.

9. The tool of claim 8, wherein the vacuum system includes at least one vacuum duct that extends from the at least one vacuum port through the tool body to carry the debris away from the tool passageway.

10. The tool of claim 9, wherein the vacuum system includes a vacuum connector coupled to the tool body at a location spaced apart from the at least one vacuum port and coupled fluidly to at least one vacuum duct, the vacuum connector configured to be coupled to an external vacuum source.

11. A tool for facilitating removal of recessed inserts from a primary component, the tool comprising
    a tool body including an interface piece with a first side adapted to be placed in contact with an outer surface of the primary component and formed to define an interface-piece aperture sized to allow a machine tool to extend through the interface piece toward a recessed insert assembled within the primary component so that the outer surface of the primary component around the interface-piece aperture is protected from the machine tool when the machine tool is inserted through the interface-piece aperture,
    a recess plug coupled to the interface piece of the tool body, the recess plug configured to extend away from the first side of the interface piece into a recess that extends from the outer surface of the primary component, the recess plug formed to define a plug aperture aligned with the interface-piece aperture and sized to allow the machine tool to extend through the recess plug toward the recessed insert so that a side surface of the primary component around the recess is protected from the machine tool when the machine tool is inserted through the plug aperture, a lighting system including a plurality of lights mounted to the tool body and configured to illuminate the interface-piece aperture so that the machine tool is visible when the machine tool is inserted through the interface-piece aperture, and a vacuum system, wherein the vacuum system includes at least one vacuum port and a vacuum connector spaced apart from the at least one vacuum port, the at least one vacuum port arranged to open directly into a tool passageway defined by the interface-piece aperture and the plug aperture in order to remove debris generated by the machine tool when used to remove the recessed insert, and the vacuum connector is in fluid communication with the at least one vacuum port and is configured to be coupled to an external vacuum source, wherein the interface piece of the tool body is formed to include a plurality of light openings arranged around the interface-piece aperture and each of the plurality of lights are arranged in a corresponding light opening, and wherein the at least one vacuum port is arranged on the same circumferential path around the inner annular face of the interface-piece aperture as the plurality of light openings.

12. The tool of claim 11, wherein the plurality of lights are spaced apart around a circumference of the interface-piece aperture.

13. The tool of claim 11, wherein the lighting system includes a battery housed in the tool body and a switch electrically coupled between the plurality of lights and the battery.

14. A tool configured to facilitate removal of recessed inserts from a primary component, the tool comprising a tool body including an interface piece with a first side adapted to be placed in contact with an outer surface of the primary component and formed to define an interface-piece aperture sized to allow a machine tool to extend through the interface piece toward a recessed insert assembled within the primary component so that the outer surface of the primary component around the interface-piece aperture is protected from the machine tool when the machine tool is inserted through the interface-piece aperture, a recess plug, the recess plug coupled to the interface piece of the tool body and configured to extend away from the first side of the interface piece into a recess that extends from the outer surface of the primary component, the recess plug formed to define a plug aperture aligned with the interface-piece aperture and sized to allow the machine tool to extend through the recess plug toward the recessed insert so that a side surface of the primary component that defines the recess is protected from the machine tool when the machine tool is inserted through the plug aperture; and a vacuum system including at least one vacuum port arranged to open directly into a tool passageway defined by the interface-piece aperture and the plug aperture in order to remove debris generated by the machine tool when used to remove the recessed insert.

15. The tool of claim 14, wherein the vacuum system includes at least one vacuum duct that extends from the at least vacuum port through the tool body to carry the debris away from the tool passageway.

16. The tool of claim 15, wherein the vacuum system includes a vacuum connector coupled to the tool body at a location spaced apart from the at least one vacuum port and coupled fluidly to the at least one vacuum duct, the vacuum connector configured to be coupled to an external vacuum source.

17. The tool of claim 14, wherein the vacuum system includes a plurality of vacuum ports spaced circumferentially from one another around the tool passageway and arranged to open into the tool passageway.

18. The tool of claim 17, further including a lighting system including a plurality of lights configured to illuminate the tool passageway, the plurality of lights each mounted to the tool body and spaced circumferentially from one another around the tool passageway.

19. The tool of claim 18, wherein the interface piece of the tool body is formed to include a plurality of light openings arranged around an inner annular face of the interface-piece aperture and each of the plurality of lights are arranged in a corresponding light opening, and wherein the plurality of vacuum ports are arranged on the same circumferential path around the inner annular face of the interface-piece aperture as the plurality of light openings and interspersed circumferentially between the plurality of lights.

* * * * *